Oct. 22, 1929.　　　C. W. THOERIG　　　1,732,667
ELECTRIC WATER HEATER
Filed Nov. 12, 1927
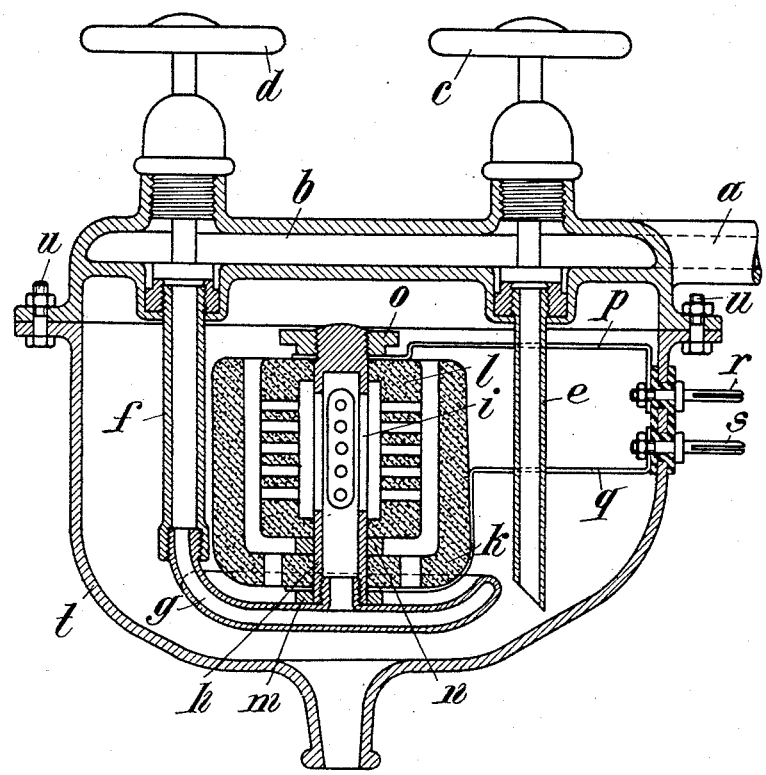
Inventor:
C. W. Thoerig
By
Attorney Patented Oct. 22, 1929

1,732,667

UNITED STATES PATENT OFFICE

CONRAD WERNER THOERIG, OF VIENNA, AUSTRIA, ASSIGNOR OF ONE-HALF TO HUGO KARVALY, OF VIENNA, AUSTRIA

ELECTRIC WATER HEATER

Application filed November 12, 1927, Serial No. 232,871, and in Austria November 19, 1926.

This invention relates to a water heater combined with a preheater for the continuous heating of running water under pressure, and the heating is effected by means of cylindric or similarly shaped electrodes which are arranged co-axially and of which the one is located within the other. The water to be heated is injected through radial bores provided in the inner electrode against the inner wall of the outer electrode, and the jets of water thus produced form individual liquid resistance conductors which are heated while the electric current is passing through them. The thus heated water flows then downwards along the inner wall of the outer electrode and is intercepted and collected below this latter in a preheating basin, over the edge of which it finally escapes to the outlet nozzle of the device.

In the case of a larger amount of water for which the outlet apertures in the bottom of the outer electrode do no more suffice, the water will flow over the top of this electrode down into said preheating basin. This basin is hollow and heated by the hot water filling it so that the fresh water which is supplied through the basin is preheated. The supply of the water to the hollow basin can be regulated by a valve, and a second valve is provided through which cold water can be admixed to the heated one so as to vary the temperature accordingly.

Owing to the arrangement of the electrodes, as above mentioned, short-circuiting cannot possibly occur, and as a further and particular safety means to that effect the outer wall of the inner electrode can be covered with a layer of an insulating material. Also the conducting wires may be insulated, and the inner surface of the casing enclosing all parts may be coated with an insulating lacquer. Besides, the casing and the water are connected up to the earth by the water pipes so that the persons handling the device are fully prevented from electric shocks.

Although I prefer electrodes of cylindrical form, still, also electrodes in the form of hoppers, or semi-spherical electrodes, electrodes in the form of pyramids, and the like, may be used. They consist, preferably, of a mixture of graphite and soot, similarly as the carbons of arc lamps. And although I prefer the constructional form shown by way of example in the accompanying drawing, the heater may be designed also as an immersion heater, and as a coin-in-the-slot heater, and the like.

The drawing shows the device in vertical section. $a$ denotes the water supply pipe through which the water is conducted into a chamber $b$ which is provided with two valves $c$ and $d$. The valve $c$ serves for closing and opening a pipe $e$ through which the water can pass directly to the discharge nozzle located at the lower end of a casing $t$ enclosing all parts. The valve $d$ opens and closes a pipe $f$, the lower end of which is connected with a hollow preheating basin $g$, from the centre of which extends upwardly a tubular member $h$ consisting preferably of india-rubber. This member has lateral openings $i$ through which the water arriving on the way $a$, $b$, $f$, $g$, $h$ escapes into the inner electrode $l$ which is surrounded with the outer electrode $k$. The tubular member $h$ is screwed onto a central branch extending upwardly from the basin $g$, and the electrodes are shoved upon said member; they are insulated from one another by an insulating ring $n$, and another insulating ring $m$ is arranged between the outer electrode and the preheating basin. The electrodes are retained in their position by a nut $o$ screwed upon the member $h$ and consisting also of an insulating material.

$p$ and $q$ are wires connecting the electrodes with contact plugs $r$ and $s$. The casing $t$ consists of a lower part and of an upper part which are connected with one another by screws $u$, as shown.

I claim:

1. An electric water heater comprising a two-part casing, the upper part consisting of a chamber in communication with a water inlet and the lower part having a water outlet therein; a pair of valves in the chamber, one of which is adapted to admit cold water into the lower part of the lower casing to vary and regulate the temperature of the water flowing out through the outlet in the lower part of the casing; a pipe associated with the other valve; a basin secured to the pipe and acting as a pre-heater; and electric heating elements associated with the basin through which the water to be heated circulates from the basin and then into the lower part of the casing to the outlet.

2. An electric water heater comprising a two-part casing, the upper part consisting of a chamber in communication with a water inlet and the lower part having a water outlet therein; a pair of valves in the upper part of the casing, one of which is adapted to admit cold water from the chamber into the lower part of the lower casing to vary and regulate the temperature of the water flowing out through the outlet in the lower part of the casing; a pipe associated with the second valve; a basin secured to the pipe and acting as a pre-heater; a tubular member secured to the basin; and electric heating elements mounted on the basin and around the tubular member, the water to be heated flowing from the chamber through the second valve, the pipe, the basin, the tubular member and then through the heating elements and into the lower part of the casing to the outlet.

3. An electric water heater comprising a two-part casing, the upper part consisting of a chamber in communication with a water inlet and the lower part having a water outlet therein; a pair of valves in the upper part of the casing, one of which is adapted to admit cold water from the chamber into the lower part of the lower casing to vary and regulate the temperature of the water flowing out through the outlet in the lower part of the casing; a basin associated with the second valve and acting as a pre-heater; a tubular member secured to the basin; and electric heating elements mounted on the basin and around the tubular member, the water to be heated flowing from the chamber through the second valve, the basin, the tubular member and then through the heating elements and into the lower part of the casing to the outlet.

4. An electric water heater comprising a two-part casing, the upper part consisting of a chamber in communication with a water inlet and the lower part having a water outlet therein; a pair of valves in the upper part of the casing, one of which is adapted to admit cold water from the chamber into the lower part of the lower casing to vary and regulate the temperature of the water flowing out through the outlet in the lower part of the casing; electric heating means in the lower part of the casing; and means for directing water from the second valve to and into the electric heating means.

5. An electric water heater comprising a two-part casing, the upper part consisting of a chamber in communication with a water inlet and the lower part having a water outlet therein; a pair of valves in the upper part of the casing, one of which is adapted to admit cold water from the chamber into the lower part of the lower casing to vary and regulate the temperature of the water flowing out through the outlet in the lower part of the casing; a pipe associated with the second valve; a basin secured to the pipe and acting as a pre-heater; a tubular member secured to the basin; electric heating elements mounted on the basin and around the tubular member, the water to be heated flowing from the chamber through the second valve, the pipe, the basin, the tubular member and then through the heating elements and into the lower part of the casing to the outlet; and means for leading an electric current into and out of the lower part of the casing and to the electric heating elements.

In testimony whereof I have affixed my signature.

C. W. THOERIG.